Figure 1:
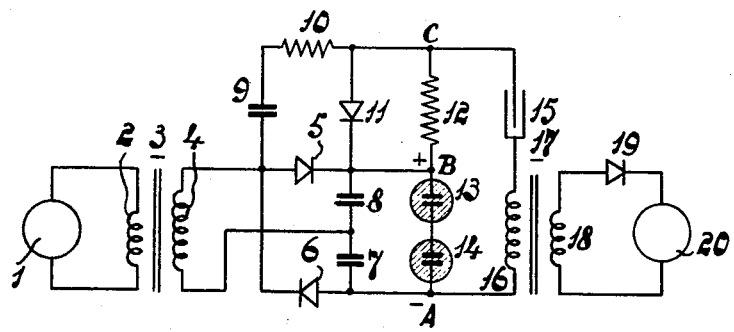

April 13, 1954  G. HEPP  2,675,484
CIRCUIT-ARRANGEMENT COMPRISING AN IONIZATION TUBE
Filed March 29, 1952

INVENTOR
Gerard Hepp
BY
Agent

Patented Apr. 13, 1954

2,675,484

UNITED STATES PATENT OFFICE 2,675,484

CIRCUIT-ARRANGEMENT COMPRISING AN IONIZATION TUBE

Gerard Hepp, Eindhoven, Netherlands, assignor to Hartford National Bank and Trust Company, Hartford, Conn., as trustee Application March 29, 1952, Serial No. 279,480

Claims priority, application Netherlands May 28, 1951

3 Claims. (Cl. 250—83.6)

This invention relates to circuit-arrangements comprising an ionisation tube and more particularly to a circuit-arrangement of this type which may be used in a lightweight and compact apparatus for measuring the intensity of a radioactive radiation.

In such apparatus it is advantageous to avoid the use of batteries or accumulators by using, for example, a hand-driven dynamo for the power supply. However, such a source supplies alternating voltage. The high direct voltage necessary for operating the ionisation tube may be obtained therefrom by stepping up and subsequent rectification of this alternating voltage. In fact, this makes possible the construction of a light-weight and compact set without the need for batteries.

As a rule the ionisation tube supplies only a small current, for example, of the order of 10 microamperes, which current is an index to the radiation intensity to be measured. Consequently, this necessitates the use of a very sensitive direct current meter. Such meters are expensive and all but robust, and hence raises a limitation to the ease of handling and sturdiness of the set.

The present invention has for its object to obviate this limitation.

In a circuit-arrangement according to the invention there is derived from the source of alternating current an auxiliary alternating voltage which is fed, in series with the output voltage of the rectifier, to the ionisation tube, with the result that the performance of the latter is periodically reduced. In series with the ionisation tube is connected the primary of a step-down transformer whose secondary is connected to the direct current meter through a second rectifier. Since the ionisation tube periodically becomes less operative the current supplied by this tube will have a fluctuating character. This current is increased by reason of the step-down transformer and of the second rectifier.

The total power available for the meter is of course not increased. The losses concomitant with the use of transformers will even slightly reduce this power. Since the current has increased, the voltage available for the meter will have decreased due to the transformation. Notwithstanding, it has been found possible to use a more robust meter. This may be seen as the effect of a sort of adaptation (due to impedance transformation) of the resistance of the meter to the internal resistance of the circuit of which the discharge tube forms part.

The invention may also be used in apparatus comprising low voltage batteries, wherein this voltage may be converted into an alternating voltage by means of a vibrator in a manner known per se. The portion constituted by the batteries and the vibrator is, within the scope of the invention, fully equivalent to a source of alternating voltage.

Figure 2:
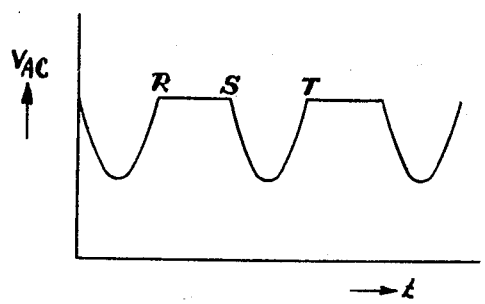

In order that the invention may be readily carried into effect, it will now be described in greater detail with reference to the accompanying drawing, given by way of example, in which:

Fig. 1 shows schematically one form of the circuit-arrangement according to the invention; and Fig. 2 is a graph for explaining Fig. 1.

In the circuit-arrangement shown in Fig. 1 a source of alternating current 1 is constituted of a hand-dynamo producing an alternating voltage of 2.5 v. effective value. This voltage is applied to the primary 2 of a transformer 3. The alternating voltage set up in the secondary 4 is full-wave rectified in a manner known per se by rectifiers 5, 6 and filtered by capacitors 7 and 8, thus producing between points A and B a direct voltage of a polarity indicated in the drawing and a value equal to twice the maximum value of the alternating voltage through the secondary 4. The portion of the circuit-arrangement including capacitors 9, resistors 10, 12 and rectifier 11 sets up an alternating voltage across resistor 12. In that half of the cycle, during which the rectifier 5 is inoperative, the lower electrode of the capacitor 9 will have a negative voltage with respect to point B, hence a current will pass from point B through resistors 12 and 10 to the upper electrode of capacitor 9. This current will render point C negative relatively to point B. In the other half of the cycle the resistor 12 is short-circuited by the now operative rectifier 11. Consequently, a unilaterally rectified alternating voltage is produced between B and C with a polarity opposite to that of the voltage set up between A and B. The voltage between A and C will vary, as a function of time, as illustrated in Fig. 2. On one-half of the cycle (between R and S) this voltage is equal to that set up between points A and B. In the other half of the cycle (between S and T) this voltage will rapidly decrease and reach a minimum value, whereupon it increases again.

Between A and C is provided the series-connection of an ionisation tube 15 and the primary 16 of a transformer 17. In connection with the voltage range in which the ionisation tube 15 is operative the voltages between A and B and between B and C are so chosen as to make the tube periodically inoperative. In Fig. 2, the ionisation tube is operative during a part RS of a cycle. During by far the greater part of the remainder ST of the cycle the ionisation tube is inoperative.

The current passing through the ionisation tube, which is an index to the intensity to be measured, will consequently be of an intermittent nature. This current passes through the primary 16 of transformer 17. Owing to the intermittent character of this current an alternating current will flow in the secondary circuit of the transformer. This current will of course not be exactly sinusoidal. The circuit connected to the secondary 18 of transformer 17 consists of the series-connection of a rectifier 19 and a meter 20, if desired bridged by a capacitor.

The transformer 17 steps down the impedance; in other words the winding 16 has more turns than the winding 18 with the result that the current passing through the meter 20 will exceed the current supplied by the ionisation tube 15. In one example the last-mentioned current had a value of 0 to 10 microamperes, the current through the meter having a value of from 0 to 200 microamperes.

As explained hereinabove, this permits the use of a meter which is less expensive and more able to withstand rough treatment than if the current through the ionisation tube were supplied direct to the meter.

In the absence of the voltage between B and C it is found that with an increase in radiation intensity the current traversing the meter passes through a maximum and then decreases rapidly, so that no unequivocal measure of the radiation intensity is obtained.

What I claim is:

1. Radiation detection apparatus comprising an ionisation tube, a source of alternating voltage, means coupled to said source to derive therefrom a supply voltage constituted by a direct voltage having an alternating current component, means to impress said supply voltage across said tube, a step-down transformer having a primary and a secondary, said primary being connected in series with said tube, a direct current indicator, and means including a rectifier to couple said indicator to said secondary.

2. Radiation detection apparatus comprising an ionisation tube, a source of alternating voltage, a rectifying circuit coupled to said source to derive therefrom a direct voltage, means coupled to said source to derive therefrom an auxiliary alternating voltage, means to supply said direct voltage in series with said auxiliary voltage across said tube, a step-down transformer having a primary and a secondary, said primary being connected in series with said tube, a direct current meter, and means including a rectifier to couple said meter to said secondary.

3. Apparatus, as set forth in claim 2, wherein said auxiliary voltage is constituted by substantially sinusoidal half-wave rectified pulses whose polarity is in opposition to the serially applied direct voltage.

References Cited in the file of this patent

UNITED STATES PATENTS

| Number | Name | Date |
|---|---|---|
| 2,197,453 | Hassler | Apr. 16, 1940 |